(12) United States Patent
Yamamoto et al.

(10) Patent No.: US 11,649,005 B2
(45) Date of Patent: May 16, 2023

(54) STRADDLE VEHICLE

(71) Applicant: KAWASAKI MOTORS, LTD., Akashi (JP)

(72) Inventors: Tomo Yamamoto, Akashi (JP); Kohei Akita, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 17/451,735

(22) Filed: Oct. 21, 2021

(65) Prior Publication Data

US 2022/0126943 A1    Apr. 28, 2022

(30) Foreign Application Priority Data

Oct. 23, 2020   (JP) .............................. JP2020-178478

(51) Int. Cl.
  *B62J 17/10*    (2020.01)
  *B62J 6/026*    (2020.01)

(52) U.S. Cl.
  CPC ............... *B62J 17/10* (2020.02); *B62J 6/026* (2020.02)

(58) Field of Classification Search
  CPC ....................................................... B62J 6/026
  See application file for complete search history.

(56) References Cited

U.S. PATENT DOCUMENTS

| | | | | |
|---|---|---|---|---|
| 4,709,774 A * | 12/1987 | Saito | ......................... | B62J 17/02 180/68.1 |
| 4,911,494 A * | 3/1990 | Imai | ......................... | B62J 17/10 296/180.1 |
| 6,276,482 B1 * | 8/2001 | Moriya | ..................... | B62J 17/02 180/68.1 |
| 9,573,645 B2 * | 2/2017 | Ishii | ......................... | B62J 17/02 |
| 9,815,503 B2 * | 11/2017 | Tsukui | ..................... | B62J 25/02 |
| 9,834,268 B2 * | 12/2017 | Tanabe | ..................... | B62J 17/04 |
| 10,144,473 B2 * | 12/2018 | Ishii | ......................... | B62J 29/00 |
| 2006/0022490 A1 * | 2/2006 | Kurakawa | ................ | B62J 17/10 296/78.1 |
| 2008/0185865 A1 * | 8/2008 | Matsuo | .................... | B62J 17/04 296/78.1 |
| 2013/0249239 A1 * | 9/2013 | Yokouchi | ................. | B62J 17/04 296/180.1 |
| 2014/0091596 A1 * | 4/2014 | Maeda | ................. | B62K 25/283 296/192 |
| 2014/0092613 A1 * | 4/2014 | Maeda | ............. | F02M 35/10013 362/476 |
| 2016/0244117 A1 * | 8/2016 | Tanabe | ..................... | B62J 17/04 |
| 2016/0297492 A1 * | 10/2016 | Yamada | ................. | B62K 11/02 |
| 2022/0204104 A1 * | 6/2022 | Imazeki | ................... | B62J 40/10 |

FOREIGN PATENT DOCUMENTS

WO    2015/071936 A1    5/2015

* cited by examiner

*Primary Examiner* — Zheng Song
(74) *Attorney, Agent, or Firm* — Fay Kaplun & Marcin, LLP

(57) ABSTRACT

A straddle vehicle includes a headlight and a first wind-receiving surface. The headlight emits light forward. The first wind-receiving surface is disposed below and adjacent to the headlight and provided so that it is positioned higher as it approaches rearward.

8 Claims, 7 Drawing Sheets

STRADDLE VEHICLE

CROSS-REFERENCE TO RELATED APPLICATIONS

The present application claims priority to JP Patent Application Serial No. JP 2020-178478 filed Oct. 23, 2021, which is incorporated herein by reference.

TECHNICAL FIELD

The present disclosure relates to a straddle vehicle.

BACKGROUND

PTL 1 (i.e., PCT International Publication No. WO2015/071936) relates to a straddle vehicle equipped with a wind passage for distributing a part of a travel wind from ahead toward a vehicle body to the rear of the vehicle body.

SUMMARY

The present disclosure relates to a straddle vehicle which could obtain stronger down-force when running in order to improve the stability of the vehicle body and braking performance.

In a first aspect of the present disclosure, a straddle vehicle having the following configuration is provided. That is, the straddle vehicle includes a headlight and a first wind-receiving surface. The headlight emits light forward. The first wind-receiving surface is disposed below and adjacent to the headlight and provided so that it is positioned higher as it approaches rearward.

As a result, while running, when a travel wind hits the first wind-receiving surface, the travel wind is deflected by the first wind-receiving surface upward as it travels rearward. By a reaction effect associated with the deflection of the travel wind, down-force generated on the vehicle body can be improved.

In a second aspect of the present disclosure, a straddle vehicle having the following configuration is provided. That is, the straddle vehicle includes a headlight. The headlight emits light forward. A wind passage having front and rear openings is formed on an outer side of the headlight in the vehicle width direction. Of the front and rear openings of the wind passage, the front opening forms an inlet of the wind passage, and the rear opening forms an outlet of the wind passage. The inlet of the wind passage is open toward the headlight. The wind passage is provided so that a lower surface of the wind passage is positioned higher as it approaches rearward.

As a result, while running, when a travel wind hits the lower surface of the wind passage, the travel wind is deflected upward as it travels rearward by the lower surface of the wind passage. By a reaction effect associated with the deflection of the travel wind, down-force generated on the vehicle body can be improved.

According to the present disclosure, a straddle vehicle with improved down-force while running can be provided.

DETAILED DESCRIPTION

Figure 1:
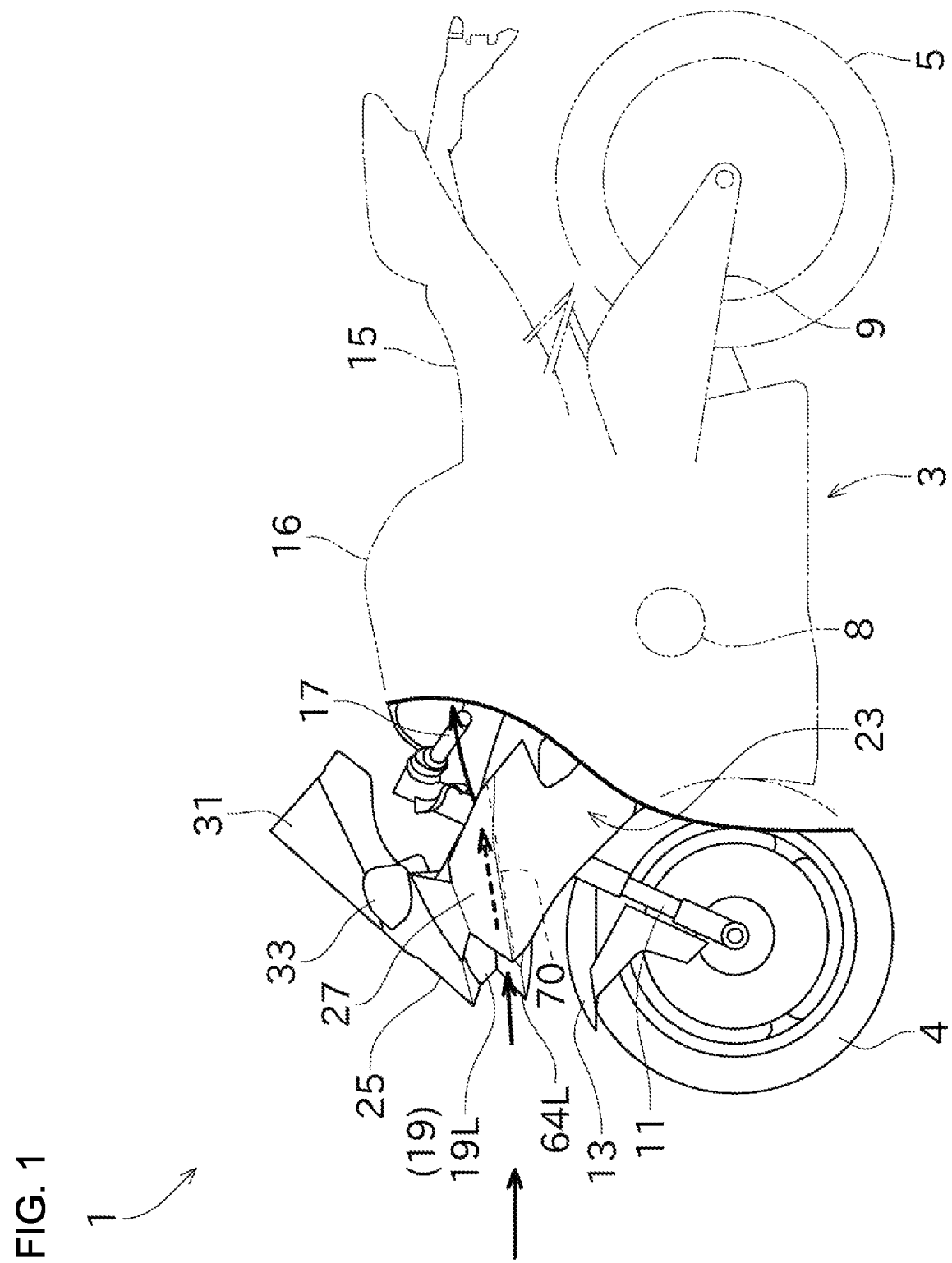
FIG. 1 shows a side view showing the overall configuration of a straddle vehicle in accordance with an embodiment of the present disclosure.

An embodiment of the present disclosure will be described with reference to the drawings. Initially, referring to FIG. 1, an overview of a straddle vehicle 1 in accordance with an embodiment of the present disclosure will be described. FIG. 1 is a side view showing the overall configuration of the straddle vehicle 1. In FIG. 1 and the other drawings, the flow of a travel wind generated when the straddle vehicle 1 is running is simply represented by arrows.

The straddle vehicle 1 of this embodiment is a motorcycle. A driver rides on the straddle vehicle 1 while straddling a vehicle body 3 and drives the straddle vehicle 1. The present disclosure can also be applied to vehicles other than motorcycles, such as a buggy-type vehicle which is three-wheeled or four-wheeled in which the driver rides astride a seat. The straddle vehicle 1 includes the vehicle body 3, a front wheel 4, and a rear wheel 5.

In the following description, unless otherwise stated, front, rear, left, right, top and bottom mean front, rear, left, right, top and bottom as seen by a driver riding in the straddle vehicle 1. In other words, the left-right direction is the vehicle width direction of the straddle vehicle 1. The left-right direction corresponds to a direction in which an axle of a drive wheel extends. The front-rear direction corresponds to the vehicle length direction of the straddle vehicle 1.

The vehicle body 3 supports an engine 8 which is a drive source for making the straddle vehicle 1 run. The engine 8 functions as a power unit to drive the rear wheel 5 which is the drive wheel. The engine 8 is configured as a gasoline engine, for example.

The driving force generated by the engine 8 is shifted by a transmission device (not shown) and transmitted to the rear wheel 5 provided at the rear of the vehicle body 3. The rear wheel 5 is provided so that it can be displaced in the vertical direction relative to the vehicle body 3. The rear wheel 5 is supported by a swing arm 9. The swing arm 9 can be displaced by a swing angle around a pivot axis extending in the left-right direction in a frame body of the vehicle body 3.

The drive source in the straddle vehicle 1 is not particularly limited, and may be, for example, an electric motor, or a composite of multiple types of devices.

The front wheel 4 is provided at a front part of the vehicle body 3. The engine 8 is disposed between the front wheel 4 and the rear wheel 5 in the front-rear direction. In detail, the engine 8 is supported by a frame part of the vehicle body 3 which is forward of the swing arm 9. The engine 8 is realized by an internal combustion engine. The internal combustion engine generates power by gas expansion that occurs during fuel combustion.

The front wheel 4 is displaceable in a vertical direction relative to the vehicle body 3. A front wheel support structure is provided at the front part of the vehicle body 3 to support the front wheel. In the present embodiment, the front wheel support structure includes front forks 11.

The front forks 11 are arranged in pairs on the left and right sides so as to sandwich the front wheel 4 in a front view. The front wheel 4 is rotatably mounted on the lower part of the front forks 11. The front forks 11 are provided with a front fender 13 which serves as a mudguard member covering the front wheel 4 from above.

A seat 15 is provided at the upper part of the vehicle body 3 on which the driver sits. A fuel tank 16 for storing fuel to be supplied to the engine 8 is provided in front of the seat 15. A steering handle 17 which can be operated by the driver is provided at the front upper part of the vehicle body 3. The steering handle 17 is disposed in front of the seat 15 and the fuel tank 16. The steering handle 17 is disposed above the front forks 11.

Headlights 19 are disposed in front of the steering handle 17. The headlight 19 receives a supply of electric power and emits light forward of the straddle vehicle 1. Each of the headlights 19 functions as a front light to illuminate the road surface in front of the vehicle. In the present embodiment, the headlights 19 are configured to be switchable between a low beam irradiation and a high beam irradiation which are predetermined. The high beam irradiation is set to illuminate upward relative to the low beam irradiation. In addition, each of the headlights 19 is provided with an adjustment mechanism capable of adjusting the direction of an optical axis along which the light is illuminated. Each of the headlights 19 is provided at a position higher than the front wheel 4 in the vertical direction and at the front part of the vehicle body 3. In the present embodiment, the headlights 19 are provided in pairs on the left and right sides so as to be symmetrical. The headlights 19 are not limited to a pair of left and right lights, but may be, for example, a single headlight arranged in the center of the left-right direction in the front part of the vehicle body 3.

In the present embodiment, the straddle vehicle 1 includes a cowl 23. The cowl 23 is an outer shell member that constitutes an outer surface of the straddle vehicle 1, and is made of a synthetic resin member. The cowl 23 is arranged to cover the area around the headlights 19 and the area below the steering handle 17 (the side surfaces of the vehicle body). The range in which the cowl 23 is disposed and the shape of the cowl 23 are examples. They may differ from the present embodiment as long as they include at least those corresponding to the periphery of the headlights 19 as described below.

The cowl 23 has a front cowl 25 and two side cowls 27, 29. The front cowl 25 is disposed mainly at the front part of the vehicle body 3, for example around the headlights 19. The front cowl 25 is provided so as to surround the top, bottom, left and right sides of the front part of the vehicle body 3. Two side cowls 27 and 29 are respectively disposed at the side parts of the vehicle body 3 and below the steering handle 17. One side cowl 27 is disposed mainly on a left side part of the vehicle body 3, and the other side cowl 29 is disposed mainly on a right side part of the vehicle body 3.

The front cowl 25 has an upper surface that covers the area above the headlight 19. The upper surface of the front cowl 25 is configured as an inclined surface so that it is positioned smoothly upward as it approaches from the front end to the rear. Each of the side cowls 27 and 29 has a side surface covering the outer side of the headlights 19 in the vehicle width direction. Each side surface of the side cowls 27, 29 is configured as an inclined surface so that it is positioned smoothly outward in the vehicle width direction as it approaches from the front end to the rear. By being provided the cowl 23 in this manner, the travel wind which hits on the vehicle body 3 can be smoothly deflected, thereby reducing running resistance of the vehicle body 3. In addition, the cowl 23 can guide the travel wind outward in the vehicle width direction and upward of the vehicle body 3. Therefore, the travel wind toward the driver can be reduced and the wind protection effect can be increased.

Figure 2:
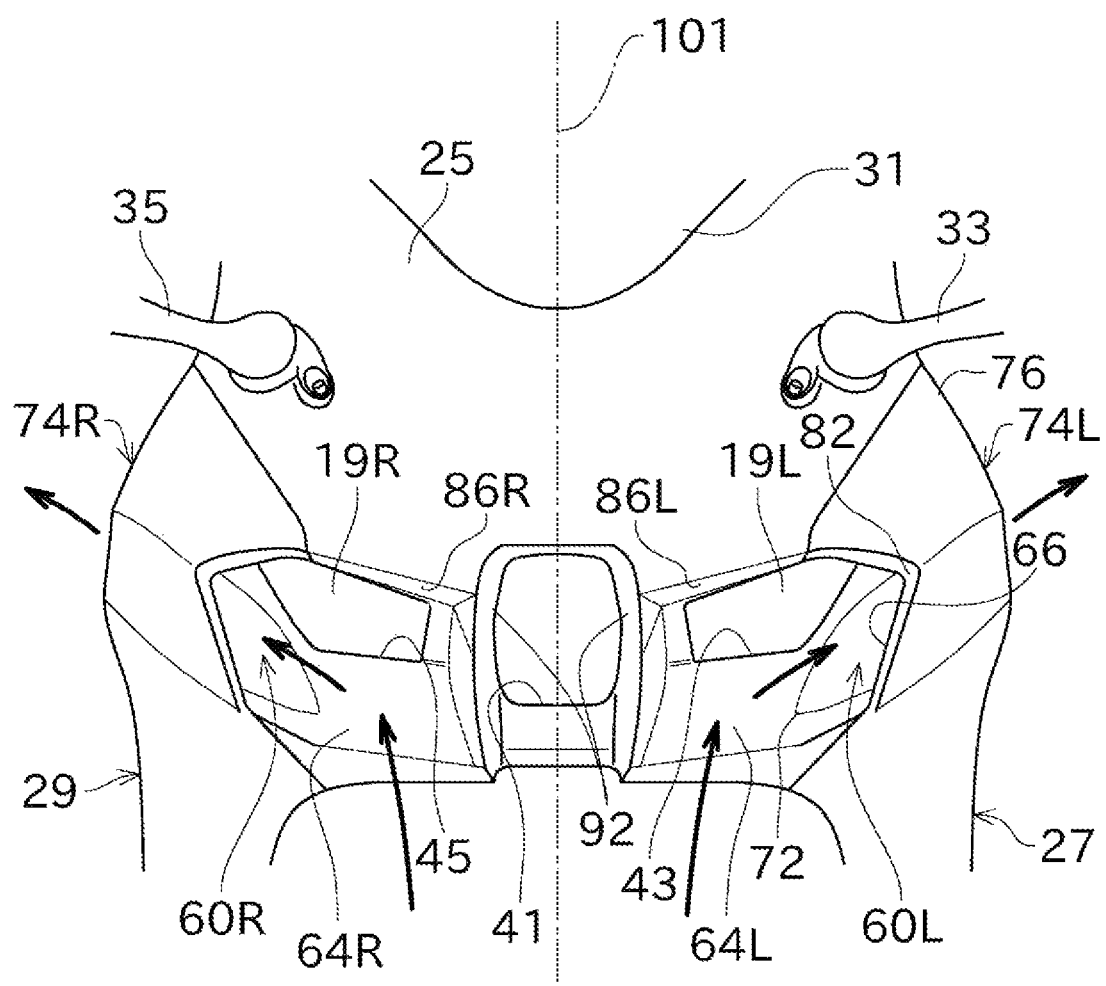
FIG. 2 shows a front view of a front part of the straddle vehicle.
Figure 3:
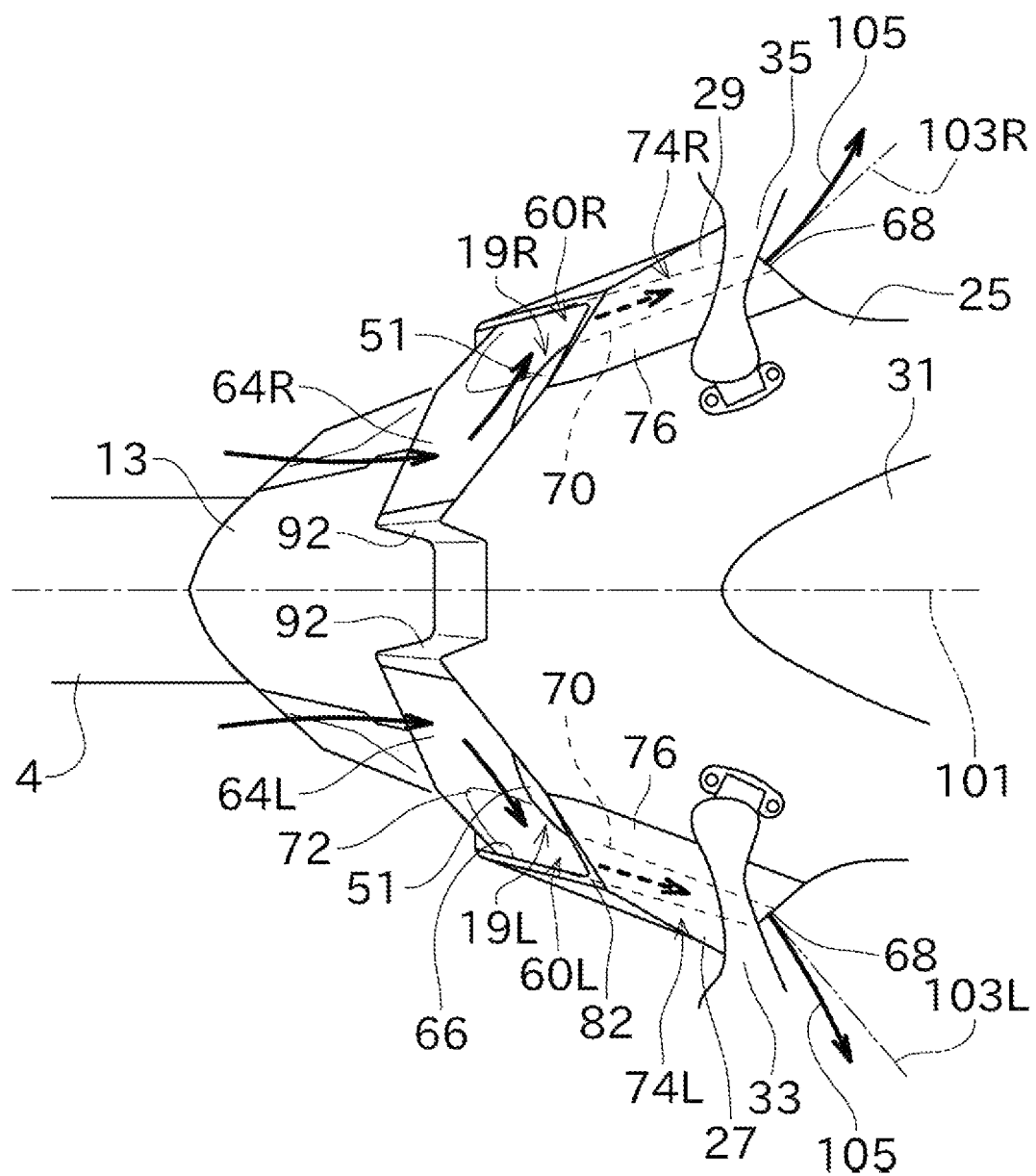
FIG. 3 shows a plan view of the front part of the straddle vehicle.
Figure 4:
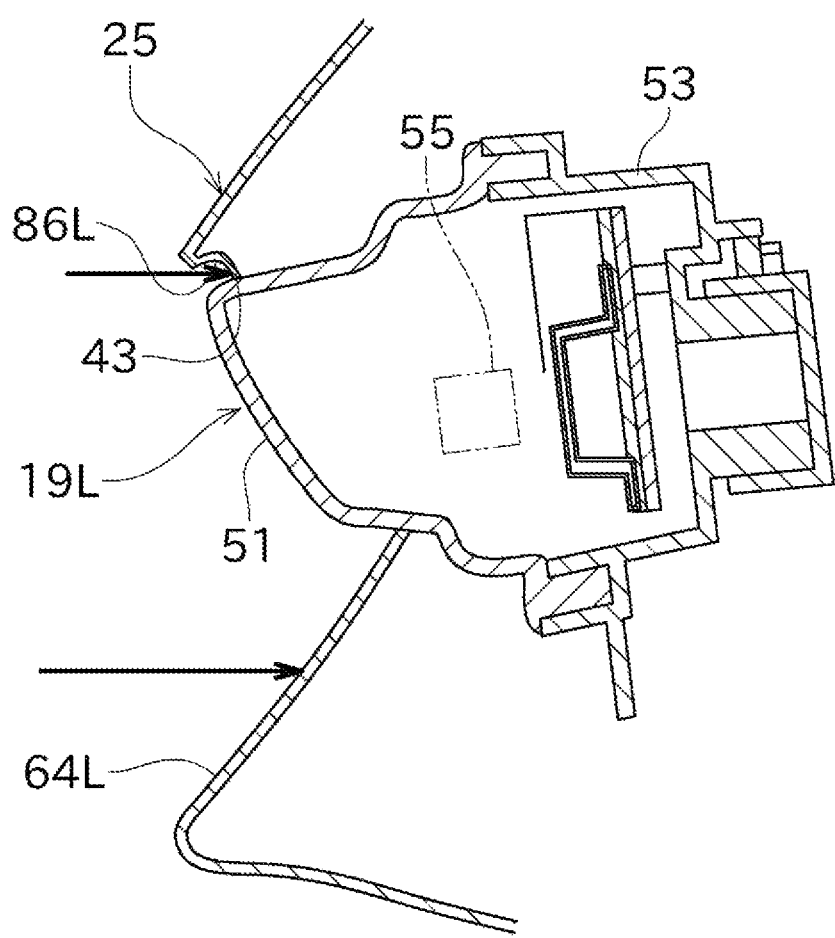
FIG. 4 shows a cross-sectional view of a headlight and its vicinity at the front part of a vehicle body.
Figure 5:
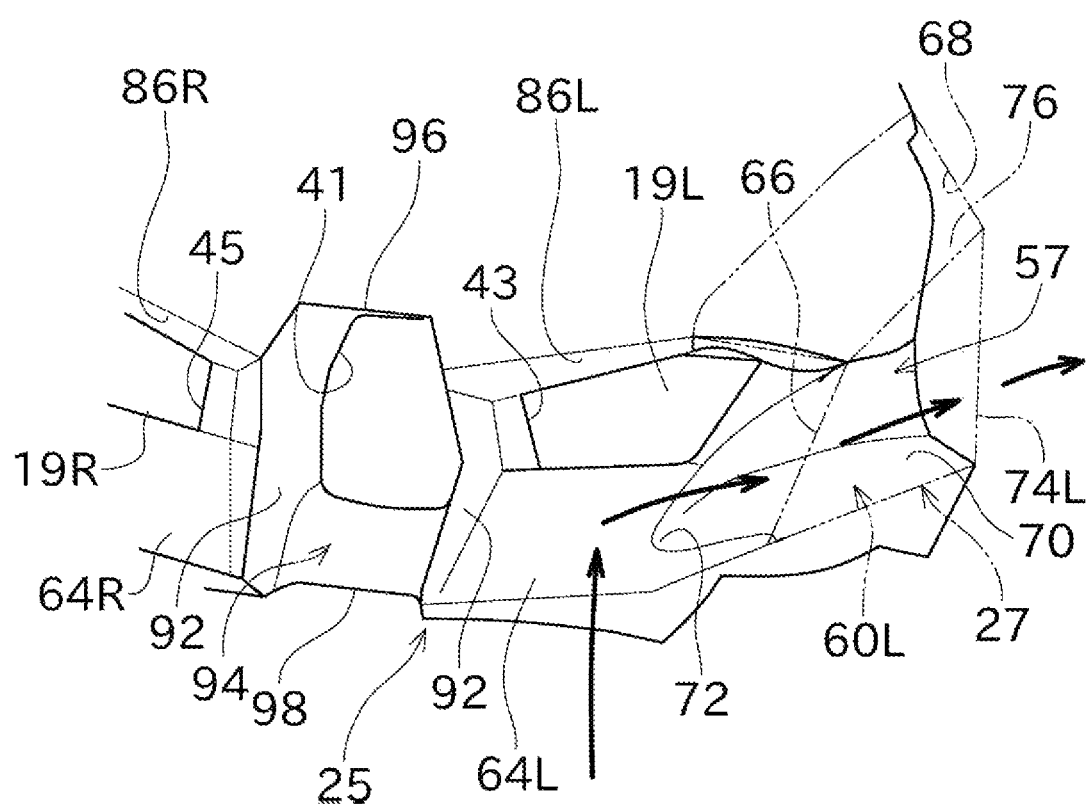
FIG. 5 shows a diagonal view showing the configuration around a left headlight of a front cowl.

Next, referring to FIGS. 2 to 5, the configuration around the headlights 19 will be described. FIG. 2 is a front view of the front part of the straddle vehicle 1. FIG. 3 is a plan view of the front part of the straddle vehicle 1. FIG. 4 is a side cross-sectional view of the headlight 19 and its vicinity at the front part of the vehicle body 3. FIG. 5 is a diagonal view of the configuration around the left headlight 19L in the front cowl 25.

The front cowl 25 is an exterior member that is exposed to the front side of the vehicle body 3. The front cowl 25 may be formed by a single member or a plurality of members which are connected to form it. The front cowl 25 is continuously provided with side cowls 27, 29 as exterior members in a smoothly connected manner. The side cowls 27, 29, like the front cowl 25, may be formed by a single member or by a plurality of members.

As shown in FIGS. 2 and 3, the front cowl 25 is configured so that the shape of a cross-section cut by a plane perpendicular to the front-rear direction enlarges as it approaches from the front end to the rear. Specifically, a front end part of the front cowl 25 is disposed at and near the center position in the vehicle width direction. The front cowl 25 is formed so that it gradually widens in the vehicle width direction and in the vertical direction as it approaches from the front end to the rear.

The front cowl 25 is configured to be substantially symmetrical with respect to a plane bisecting the vehicle width of the straddle vehicle 1 (indicated by a virtual line 101 in FIGS. 2 and 3). The upper part of the front cowl 25 is provided with a windshield 31 which slopes so that it is positioned higher as it approaches rearward. Left and right side mirrors 33, 35 are provided on the left and right sides of the front cowl 25, respectively.

In a front view, a plurality of openings are formed at an intermediate part in the vertical direction of the front cowl 25, as shown in FIG. 2. The plurality of openings are lined up in the vehicle width direction. The plurality of openings are the airflow guiding hole 41 and left and right lamp holes 43, 45. The left and right lamp holes 43, 45 are arranged so as to sandwich the airflow guiding hole 41 in the vehicle width direction.

Since the configuration around the headlight 19 is substantially symmetrical with respect to the plane indicated by the virtual line 101, the left side configuration will be mainly described below. In the following description, with respect to the configuration that is substantially symmetrical, the left side member/part may be indicated with L at the end of the reference numeral, and the right side member/part may be indicated with R at the end of the reference numeral.

The airflow guiding hole 41 is a hole to let the travel wind in for supplying to the engine 8. In the present embodiment, the airflow guiding hole 41 is disposed in the center of the front cowl 25 in the vehicle width direction. The airflow guiding hole 41 is open toward the front of the vehicle body 3. An airflow guiding duct provided in the vehicle body 3 is connected to the airflow guiding hole 41. This airflow guiding duct forms a path for supplying the travel wind led in through the airflow guiding hole 41 to the engine 8 via an air cleaner or the like. By leading the travel wind into the airflow guiding hole 41, the air which becomes high pressure in proportion to the running speed can be easily led to the engine 8, and an amount of air supplied to the engine 8 can be increased.

A left headlight 19L is provided in the left lamp hole 43. The left headlight 19L is disposed to the left of the airflow guiding hole 41. As shown in FIG. 4, the left headlight 19L has an irradiation surface 51 that is exposed in front of the vehicle body 3. The irradiation surface 51 is an outer surface of the left headlight 19L and a surface through which light irradiated to the front is transmitted.

The left headlight 19L includes a housing 53, a light source 55, a lens, and a reflector. The left headlight 19L is an LED type in this embodiment. The housing 53 accommodates the light source 55. The light source 55 is a light emitting diode (LED). The irradiation surface 51 is formed by a lens having translucency. In the present embodiment, the lens is realized by a resin material and covers the lamp holes 43 and 45 formed in the front cowl 25. The light source 55 of the headlight 19 is not limited to a light emitting diode. The reflector is composed of a plurality of reflection plates arranged at various angles. The reflector guides light in a predetermined direction and within a predetermined range by reflecting the light emitted by the light source 55. In this embodiment, the lens is formed in a horizontal shape whose vehicle width direction dimension is larger than the vertical direction dimension.

As shown in FIG. 5, a recess 57 is formed in an outer side part of the front cowl 25. The recess 57 is formed to open the outer side in the vehicle width direction. The recess 57 is formed in the form of an elongated groove extending in the front-rear direction. The recess 57 is concave inward in the vehicle width direction. The longitudinal direction of the recess 57 is substantially along the front-rear direction. But, the longitudinal direction of the recess 57 is inclined so that, as it approaches from the front end to the rear, it is positioned outer in the vehicle width direction and upper. In other words, a lower surface of the recess 57 is formed as an inclined surface so that it is positioned upward as it approaches rearward. The inner side in the vehicle width direction of the recess 57 is formed as an inclined surface so that it is positioned smoothly outward in the vehicle width direction as it approaches rearward. The front end part of the recess 57 is located to the left of the lamp hole 43 (headlight 19L).

In the present embodiment, the recess 57 is covered from outer side in the vehicle width direction by a part of the side cowl 27. In FIG. 5, the side cowl 27 is shown transparently as a double-dotted chain line. In the space enclosed by the recess 57 and a part of the side cowl 27, a left wind passage 60L described below is formed.

A right headlight 19R is provided in the right lamp hole 45. In this embodiment, the right headlight 19R is configured substantially in the same manner as the left headlight 19L. A right wind passage 60R is provided near a right outer side of the front cowl 25.

Figure 6:
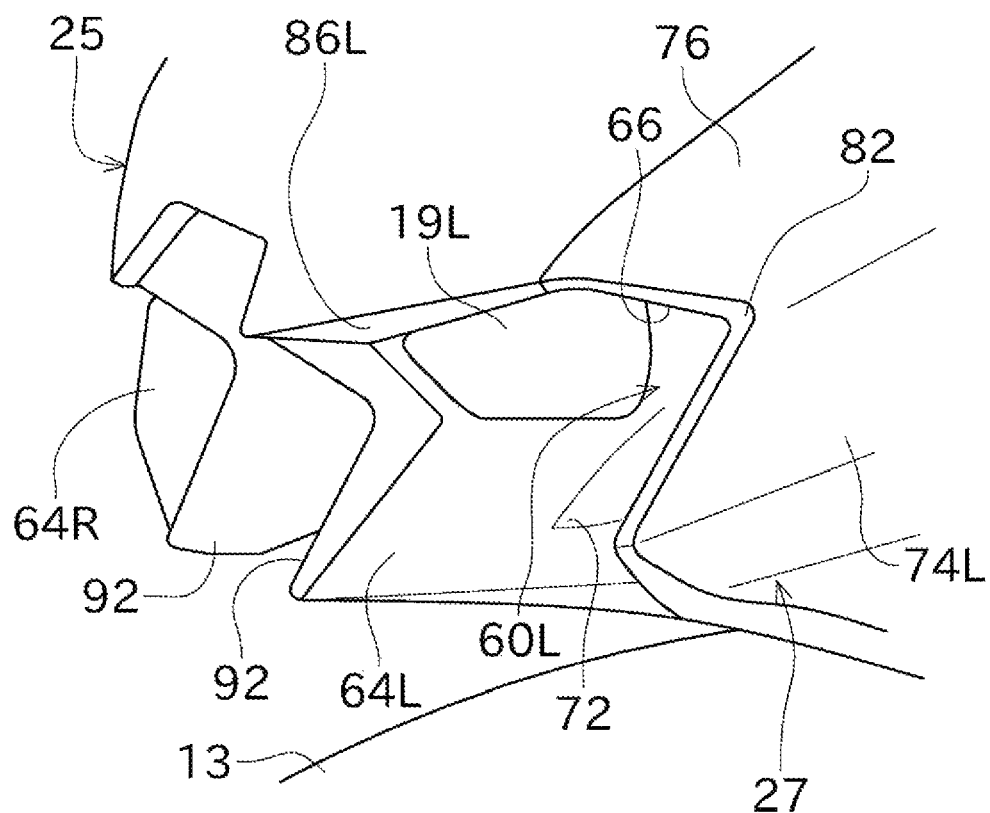
FIG. 6 shows a diagonal view of the front part of the vehicle body as viewed from the left front.
Figure 7:
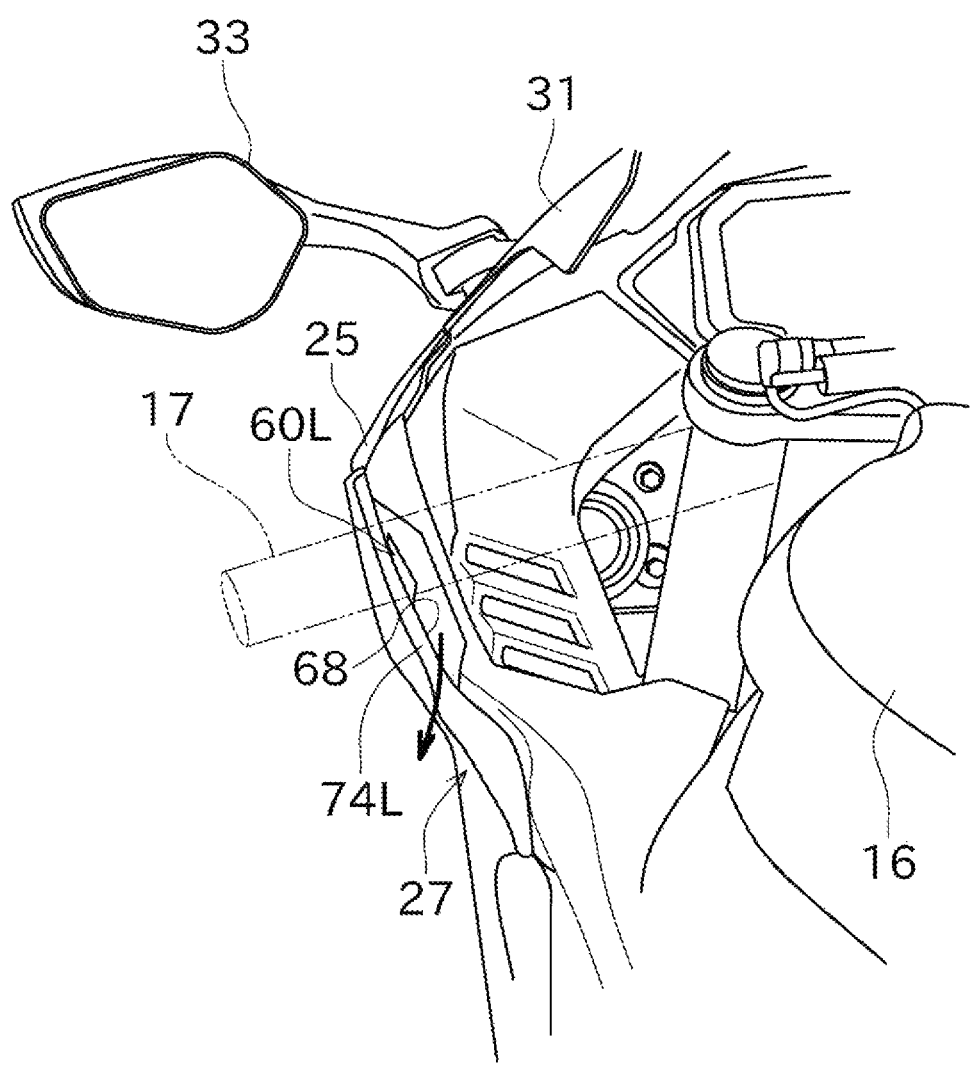
FIG. 7 shows a diagonal view of the front part of the vehicle body as viewed from the left rear.

Next, referring to FIGS. 2 to 7, the configuration of the wind passage 60L and its vicinity will be described. FIG. 6 is a diagonal view of the front part of the vehicle body 3 as viewed from the left front. FIG. 7 is a diagonal view of the front part of the vehicle body 3 as viewed from the left rear.

A part of the travel wind generated when the straddle vehicle 1 is running is led to the wind passage 60L. In order to guide a part of this travel wind into the wind passage 60L, as shown in FIGS. 2, 3, 5, and 6, a first wind-receiving surface 64L is provided so as to face an inlet 66 of the wind passage 60L. In the present embodiment, the first wind-receiving surface 64L is formed by a part of the front cowl 25. The first wind-receiving surface 64L may be constituted of a member different from the front cowl 25. The first wind-receiving surface 64L is provided in a fixed position relative to the headlight 19.

The first wind-receiving surface 64L is disposed in front of the left headlight 19L (left lamp hole 43). Specifically, the first wind-receiving surface 64L is disposed at a position where an upper edge thereof is in contact with a lower edge of the lens which is opposing the first wind-receiving surface 64L. As shown in FIG. 2, the first wind-receiving surface 64L is disposed so that its length in the vehicle width direction overlaps the length in the vehicle width direction of the left headlight 19L by half or more. In the present embodiment, the first wind-receiving surface 64L has a width in the vehicle width direction that is equal to or greater than the vehicle width direction length of the lower edge of the lens which is opposing the first wind-receiving surface 64L. The first wind-receiving surface 64L has an extended part extending inward in the vehicle width direction more than an inner end of the lower edge of the lens in the vehicle width direction. The upper edge of the first wind-receiving surface 64L is inclined so that it is positioned rearward as it approaches outward in the vehicle width direction. Similarly, the lower edge of the lens surface (irradiation surface 51) opposing the first wind-receiving surface 64L is inclined so that it is positioned rearward as it approaches outward in the vehicle width direction.

The inlet 66 of the wind passage 60L is disposed adjacent to an outer part of the first wind-receiving surface 64L in the vehicle width direction. As shown in FIG. 6, the side cover defining the wind passage 60L has a covering part. In a side view, the covering part covers an outer end in the vehicle width direction of the upper edge of the first wind-receiving surface 64L from the outer side in the vehicle width direction. Specifically, the side cover has a front part that is formed in an angular shape. The front part of the side cover has a front upper side and a front lower side. The front upper side is positioned rearward as it approaches upward from a distal end part. The front lower side is positioned rearward as it approaches downward from the distal end part. The front part which is angularly formed is disposed opposite the outer end in the vehicle width direction of the upper edge of the first wind-receiving surface 64L in the vehicle width direction.

The first wind-receiving surface 64L is disposed below and adjacent to the left headlight 19L. The first wind-receiving surface 64L is diagonally directed so that it is positioned higher as it approaches from the front end to the rear (toward the left headlight 19L). In detail, the first wind-receiving surface 64L is formed in a flat surface shape. The front end of the first wind-receiving surface 64L is disposed above the front wheel 4 and rearward than the front end of the front wheel 4. The first wind-receiving surface 64L is formed in an inclined manner so that its height position gradually increases as it approaches from the front end toward the rear (toward the left headlight 19L).

As a result, when the straddle vehicle 1 is running, the first wind-receiving surface 64L receives a part of the travel wind. This part of travel wind hits on the first wind-receiving surface 64L and is deflected upward along the first wind-receiving surface 64L while flowing rearward. In the present embodiment, the travel wind deflected by the first wind-receiving surface 64L passes through the wind passage 60L and flows out to the rear of the vehicle body. The travel wind is deflected upward by the first wind-receiving surface 64L, and then flows to the rear of the vehicle body. In this manner, the travel wind coming from ahead as the vehicle runs is deflected sequentially by the first wind-receiving surface 64L. In this way, down-force can be generated in the process of deflecting the flow of the travel wind upward. Consequently, the grip of the front wheel 4 can be improved.

The first wind-receiving surface 64L is disposed in front of the left headlight 19L. Compared to the case where the first wind-receiving surface 64L is provided at an outer side of the left headlight 19L in the vehicle width direction, this layout can prevent the first wind-receiving surface 64L from protruding outward in the vehicle width direction than the left headlight 19L. Therefore, the vehicle width direction dimension of the vehicle body 3 as a whole can be prevented from becoming larger. In addition, the first wind-receiving surface 64L is formed in front of the left headlight 19L. Therefore, the space around the cowl 23 in the vehicle width direction that is required for arranging the left headlight 19L can be effectively utilized and the first wind-receiving surface 64L in the vehicle width direction can be easily enlarged, while preventing the vehicle body 3 as a whole from becoming larger in the vehicle width direction. Therefore, a configuration that can obtain down-force well can be realized.

As shown in FIG. 3, the first wind-receiving surface 64L is arranged in an inclined manner so that it is positioned rearward as it approaches from the center to the outer side (left side) in the vehicle width direction. In other words, the upper edge of the first wind-receiving surface 64L is formed so as to extend in parallel with the lower edge of the lens surface opposing the first wind-receiving surface 64L. Therefore, the first wind-receiving surface 64L is formed in an approximately parallelogram shape in a plan view, having two sides that are substantially parallel to the lower edge of the lens surface.

The wind passage 60L is formed at the outer side of the first wind-receiving surface 64L in the vehicle width direction and in rear of the first wind-receiving surface 64L. In the present embodiment, the first wind-receiving surfaces 64L, 64R and the wind passages 60L, 60R are provided on both left and right sides of the front part of the vehicle body 3. However, the first wind-receiving surface and the wind passage may be configured to be provided on only one of left and right side. In the present embodiment, a part of the wind passage 60L is defined by a part of the front cowl 25. Specifically, an inner edge of the wind passage 60L in the vehicle width direction includes a wind receiving surface adjacent region. The wind receiving surface adjacent region is adjacent to the first wind-receiving surface 64L and bends rearward. In addition, an inner edge of the wind passage 60L in the vehicle width direction includes a lens adjacent region. The lens adjacent region is adjacent to an end of the lens surface in the vehicle width direction and bends rearward. In the present embodiment, in a cross-section perpendicular to the longitudinal direction of the wind passage 60L, the wind passage 60L is formed in a triangular cross-sectional shape in which the vehicle width direction dimension decreases as it approaches upward. A guide surface is also formed in a front part of the inlet 66 of the wind passage 60L. The guide surface is, similar to the first wind-receiving surface 64L, inclined so that it is positioned higher as it approaches from the front end to the rear (to the left headlight 19L side).

The wind passage 60L is an elongated tunnel-like passage which has openings in a front end and a rear end. The wind passage 60L is formed inside a tubular part formed by the cowl 23. In the wind passage 60L, the travel wind led in from one opening is prevented from leaking out at the longitudinal middle part and exits from the other opening. The longitudinal direction of the wind passage 60L is approximately along the front-rear direction, but the wind passage 60L is arranged diagonally so that it is positioned upward and outward in the vehicle width direction as it approaches from the front end to the rear. Openings are formed at the front end and the rear end of the wind passage 60L, respectively. As described above, the wind passage 60L is formed by the inner cowl and the outer cowl (side cowl 27). A part of the front end of the outer cowl is disposed at a distance from the inner cowl in the vehicle width direction. As a result, the inlet 66 of the wind passage 60L is defined. Similarly, a part of the rear end of the outer cowl is disposed at a distance from the inner cowl in the vehicle width direction. As a result, an outlet 68 of the wind passage 60L is defined. In this embodiment, the front part of the inner cowl is constituted by the front cowl 25. The rear part of the inner cowl is constituted by an upper cowl. The upper cowl is connected to the rear end of the front cowl 25 and extending on outer side of a steering shaft in the vehicle width direction.

Of the openings of the wind passage 60L, the front opening functions as the inlet 66 for leading a part of the travel wind into the wind passage 60L. The rear opening functions as the outlet 68 for discharging the travel wind led into the wind passage 60L to the outside. As shown in FIGS. 2 and 6, the inlet 66 of the wind passage 60L is open in front. The inlet 66 is open toward the left headlight 19L. In detail, the inlet 66 is open to a space immediately in front of the left headlight 19L. As shown in FIGS. 3 and 7, the outlet 68 of the wind passage 60L opens toward the rear of the front cowl 25 and toward the outside of the vehicle width direction with respect to the vehicle body 3.

As shown in FIG. 5, the lower surface 70 in the wind passage 60L is inclined so that it is positioned higher as it approaches rearward. The front end of the lower surface 70 is disposed near an upper end of the first wind-receiving surface 64L. The rear end of the lower surface 70 is disposed at a position higher than the upper end of the first wind-receiving surface 64L. The lower surface 70 is formed in a flat surface shape. The lower surface 70 is formed so that the vehicle width direction dimension becomes narrower as it approaches rearward. In the present embodiment, the lower surface 70 is constituted by the lower inner wall of the recess 57 in the left side part of the front cowl 25. However, the lower surface 70 may be formed on the side cowl 27.

As a result, the travel wind received by the first wind-receiving surface 64L flows to the inlet 66 of the wind passage 60L on the outer side in the vehicle width direction and is led out rearward from the outlet 68 of the wind passage 60L. By having the lower surface 70 receive the travel wind passing through the wind passage 60L, the down-force can be further generated.

In the present embodiment, the front end part 72 of the lower surface 70 forming the wind passage 60L is disposed at substantially the same height as a middle part in the front-rear direction of the outer end in the vehicle width direction of the first wind-receiving surface 64L. At this part, the front end part 72 of the lower surface 70 and the first wind-receiving surface 64L are connected. This allows the travel wind to be smoothly guided from the first wind-receiving surface 64L to the wind passage 60L.

The wind passage 60L is formed diagonally so that it is positioned outward in the vehicle width direction as it approaches rearward from the inlet 66 to the outlet 68. An outer wall 74L is provided on the outer side of this wind passage 60L in the vehicle width direction. In this embodiment, the outer wall 74L is constituted of a part of the side cowl 27.

The outer wall 74L constitutes a left side wall of the wind passage 60L. The wind passage 60L is formed by a space enclosed by the right side wall, the upper side wall, and the lower side wall (including the lower surface 70), in addition to the left side wall. Consequently, the wind passage 60L is partitioned from the outside of the vehicle body 3. The right side wall and the lower side wall of the wind passage 60L are constituted of a part of the recess 57 of the front cowl 25. The upper side wall 76 of the wind passage 60L is constituted of a part of the recess 57 of the front cowl 25 and a part of the side cowl 27 overlapping the recess 57.

Since the wind passage 60L is provided with the outer wall 74L as described above, when the travel wind passes through the wind passage 60L, the travel wind is prevented from deviating from the wind passage 60L to the outer side in the vehicle width direction and is guided from the inlet 66 to the outlet 68. Therefore, the down-force can be further increased by preventing a decrease in the air volume of the travel wind passing through the wind passage 60L. Moreover, since the wind passage 60L is provided with the upper side wall 76, the travel wind led into the wind passage 60L can be further prevented from deviating upward from the wind passage 60L, thereby further increasing the down-force.

As shown in FIG. 3, the wind passage 60L is formed so that, at the outlet 68, an axis line 103L of the wind passage 60L approaches outward in the vehicle width direction. As a result, when the travel wind is led out from the outlet 68 of the wind passage 60L, the travel wind carries on in a direction (the direction of an arrow 105 in FIG. 3) away from the vehicle body 3 in the vehicle width direction. Therefore, the travel wind from the wind passage 60L can be prevented from heading toward the driver riding in the straddle vehicle 1, and the wind protection for the driver can be improved.

In the present embodiment, the wall of the wind passage 60L includes the outer wall 74L that covers the outer side of the wind passage 60L in the vehicle width direction. As shown in FIG. 3, the outer wall 74L has a part that protrudes forward than the irradiation surface (front surface) 51 of the left headlight 19L. The front end of the outer wall 74L is disposed forward than an end on the wind passage 60L side of the irradiation surface 51 of the left headlight 19L. This makes it easier to lead the travel wind which has hit on the left headlight 19L to the wind passage 60L.

In addition, the wind passage 60L is formed so as to become narrower as it approaches from the inlet 66 to the outlet 68. In other words, the wind passage 60L is formed by the walls constituting the wind passage 60L so that the passage area gradually decreases as it approaches from the inlet 66 to the outlet 68. Therefore, the travel wind passing through the wind passage 60L increases the flow velocity, so that the down-force by the wind passage 60L can be well obtained.

The front edge of the outer wall 74L is formed such that a middle part 82 in the vertical direction thereof is rearward than an upper part and a lower part thereof, as shown in FIG. 6. Specifically, the front edge of the outer wall 74L is formed in a laterally facing V-shape in a side view. The front edge of the outer wall 74L forms an outer part in the vehicle width direction of the inlet 66 of the wind passage 60L. Consequently, the light irradiated by the left headlight 19L is less likely to be blocked by the outer wall 74L, so that the light can be irradiated over a wide area.

As shown in FIGS. 2, 5, and 6, a second wind-receiving surface 86L is provided on the front cowl 25. The second wind-receiving surface 86L is disposed on the opposite side of the first wind-receiving surface 64L across the left headlight 19L in the vertical direction. In the same manner as the first wind-receiving surface 64L, the second wind-receiving surface 86L is disposed adjacent to the inlet 66 of the wind passage 60L in the vehicle width direction. The second wind-receiving surface 86L is constituted by a part of the front cowl 25.

The second wind-receiving surface 86L is disposed in front of the left headlight 19L (left lamp hole 43). The second wind-receiving surface 86L is disposed so that its length in the vehicle width direction overlaps with the length of the left headlight 19L in the vehicle width direction by half or more. The inlet 66 of the wind passage 60L is disposed adjacent to an outer part of the second wind-receiving surface 86L in the vehicle width direction.

The second wind-receiving surface 86L is disposed above and adjacent to the left headlight 19L. The second wind-receiving surface 86L is provided so that it is positioned lower as it approaches rearward (toward the left headlight 19L). In detail, the second wind-receiving surface 86L is formed in a flat surface shape. The front end of the second wind-receiving surface 86L is disposed above the first wind-receiving surface 64L. The front end of the second wind-receiving surface 86L is disposed rearward than the front end of the first wind-receiving surface 64L. A region adjacent to the second wind-receiving surface 86L is formed at an outer edge of the wind passage 60L in the vehicle width direction. In other words, the outer edge in the vehicle width direction of the wind passage 60L is formed in a curved shape connecting the outer edge in the vehicle width direction of the front end of the second wind-receiving surface 86L and the outer edge in the vehicle width direction of the front end of the first wind-receiving surface 64L.

This prevents, when the straddle vehicle 1 is running, the travel wind that has hit on the left headlight 19L from flowing so that it rides upward against the left headlight 19L. Each of a travel wind that hits on the first wind-receiving surface 64L, a travel wind that hits on the second wind-receiving surface 86L, and a travel wind that hits on the lens surface can be led to the wind passage 60L. Therefore, the down-force can be further increased.

In the present embodiment, the area of the second wind-receiving surface 86L is set to be smaller than the area of the first wind-receiving surface 64L. In the present embodiment, the front-rear direction width of the second wind-receiving surface 86L is set to be smaller than the front-rear direction width of the first wind-receiving surface 64L. Therefore, the influence by the first wind-receiving surface 64L can be enhanced more than that of the second wind-receiving surface 86L, and the up-force caused by receiving the travel wind can be prevented.

In the front cowl 25, the airflow guiding hole 41 is located between the left and right lamp holes 43, 45 in a front view. Between the respective lamp holes 43 (45) and the airflow guiding hole 41, a partition wall 92 is formed so as to project forward to divide the travel wind generated when the straddle vehicle is running. The partition wall 92 divides the travel wind in the vehicle width direction. The front end (protruding end) of the partition wall 92 is provided to be adjacent to the front end of the first wind-receiving surface 64L and the front end of the second wind-receiving surface 86L in the vehicle width direction. This partition wall 92 enables the traveling wind to be smoothly divided and flowed around the left and right headlights 19L and 19R and to the airflow guiding hole 41 when the straddle vehicle 1 is running.

Here, as shown in FIG. 5, an inlet part 94 of the airflow guiding hole 41 is formed such that a lower edge 98 is positioned forward of an upper edge 96. This enables the layout so that the travel wind flows to the airflow guiding hole 41 smoothly when the straddle vehicle 1 is running.

As mentioned above, the inlet 66 of the wind passage 60L is open to a space immediately in front of the left headlight 19L. Related to this, the irradiation surface 51 of the left headlight 19L is formed in an inclined manner so that it is positioned rearward as it approaches outward in the vehicle width direction, as shown in FIG. 3. The outer part in the vehicle width direction of the irradiation surface 51 of the left headlight 19L is disposed so as to face the wind passage 60L. As a result, when the straddle vehicle 1 is running, the travel wind that has hit on the irradiation surface 51 of the left headlight 19L is easily guided smoothly to the inlet 66 of the wind passage 60L.

As shown in FIG. 4, the irradiation surface 51 of the left headlight 19L is inclined so that it is positioned forward as it approaches upward. In the present embodiment, the irradiation surface 51 of the left headlight 19L is an approximately flat surface in cross-sectional view, but is formed to be slightly curved so as to be convex forward.

This allows the travel wind that has hit on the irradiation surface 51 of the left headlight 19L to flow closer to the first wind-receiving surface 64L located below the left headlight 19L. An amount of the travel wind led to the lower side near the inlet 66 of the wind passage 60L can be increased. Therefore, the flow velocity of travel wind flowing along the lower surface 70 can be increased. Accordingly, the down-force generated by the wind passage 60L can be further improved.

As described above, the straddle vehicle 1 of the present embodiment includes the left headlight 19L and the first wind-receiving surface 64L. The left headlight 19 emits light forward. The first wind-receiving surface 64L is disposed below and adjacent to the left headlight 19L. The first wind-receiving surface 64L is provided so that it is positioned higher as it approaches rearward.

This allows the first wind-receiving surface 64L to generate down-force by receiving the travel wind when the straddle vehicle 1 is running. Consequently, the down-force while running can be improved. As a result, for example, stability of the vehicle body 3 and a braking performance can be improved. In addition, the down-force effect can be increased by having the travel wind in front of the headlight 19 which is relatively high speed hit on the first wind-receiving surface 64L. Furthermore, the distance from the center of gravity of the vehicle body 3 to the first wind-receiving surface 64L can be increased, and the moment force that pushes the front end of the vehicle body 3 downward around the center of gravity of the vehicle body can be increased. Therefore, the down-force effect can be increased. Furthermore, the first wind-receiving surface 64L is disposed in front of the axle of the front wheel 4, which makes it easier to provide the axle of the front wheel 4 with downward pushing force. Accordingly, the grip of the front wheel 4 can be improved.

Also, the first wind-receiving surface 64L is disposed in front of the left headlight 19L. Therefore, compared to the case where the first wind-receiving surface 64L is provided at outer side in the vehicle width direction of the left headlight 19L, the first wind-receiving surface 64L can be prevented from protruding outward in the vehicle width direction than the left headlight 19L. Consequently, the vehicle width direction dimension of the vehicle body 3 as a whole can be prevented from becoming larger. In addition, by providing the first wind-receiving surface 64L in front of the left headlight 19L, it is possible to achieve a layout that effectively utilizes a space around the cowl 23 in the vehicle width direction that is required for the placement of the left headlight 19L. That is, while preventing the vehicle body 3 as a whole from becoming larger in the vehicle width direction, it becomes easier to make the left headlight 19L larger in the vehicle width direction and the front-rear direction.

Since the straddle vehicle 1 is formed in a relatively small size compared to a four-wheeled vehicle, vertical drag force with respect to the straddle vehicle 1 is small. By obtaining down-force as described above, it is possible to compensate for the small vertical drag force and improve the acceleration/deceleration behavior of the straddle vehicle 1.

In the straddle vehicle 1 of the present embodiment, the wind passage 60L having the front and rear openings is formed on the outer side of the first wind-receiving surface 64L in the vehicle width direction. Of the front and rear openings of the wind passage 60L, the front opening forms the inlet 66 of the wind passage 60L and the rear opening forms the outlet 68 of the wind passage 60L. The inlet 66 of the wind passage 60L is open toward the first wind-receiving surface 64L and the left headlight 19L. The wind passage 60L is provided so that the lower surface of the wind passage 60L is positioned higher as it approaches rearward.

As a result, the travel wind collected to the upper edge of the first wind-receiving surface 64L flows to the inlet 66 of the wind passage 60L located outer side in the vehicle width direction of the first wind-receiving surface 64L. The travel wind which has flowed into the wind passage 60L is flowed out rearward from the outlet 68 of the wind passage 60L. By having the lower surface 70 receive the travel wind passing through the wind passage 60L, the down-force can be generated more strongly. The travel wind collected to the upper end of the first wind-receiving surface 64L flows into the lower side near the inlet 66 of the wind passage 60L. As a result, the travel wind having a high flow velocity can flow toward the lower surface 70, and the down-force resulting from deflecting a large amount of travel wind at the lower surface 70 can be obtained. By using the travel wind collected by the first wind-receiving surface 64L in which it is easy to increase the pressure receiving area as described above, the down-force by the wind passage 60L can be further increased. In addition, the lower surface 70 narrows in the vehicle width direction as it approaches rearward, thereby compensating for the decrease of the travel wind caused by passing through the wind passage 60L. This can make it easier to generate down-force over the entire wind passage 60L.

In the straddle vehicle 1 of the present embodiment, the wind passage 60L is formed diagonally so that it is positioned outward in the vehicle width direction as it approaches rearward from the inlet 66 to the outlet 68 of the wind passage 60L while passing the outer side relative to the left headlight 19L in the vehicle width direction. This wind passage 60L is provided with the outer wall 74L on the outer side of the wind passage 60L in the vehicle width direction.

As the outer wall 74L is provided, when the travel wind passes through the wind passage 60L, the travel wind can be prevented from deviating from the wind passage 60L in a direction away from the vehicle body 3 and can be guided from the inlet 66 to the outlet 68. Therefore, a decrease in the air volume of the travel wind passing through the wind passage 60L can be prevented and an even stronger down-force can be obtained.

In the straddle vehicle 1 of the present embodiment, the wind passage 60L is provided with the upper side wall 76.

This further prevents the travel wind from deviating from the wind passage 60L in a direction away from the vehicle body 3 when the travel wind passes through the wind passage 60L, thereby obtaining an even stronger down-force.

In the straddle vehicle 1 of the present embodiment, the wind passage 60L is formed so that, at the outlet 68 of the wind passage 60L, the axis line 103L of the wind passage 60L approaches outward in the vehicle width direction.

As a result, when the travel wind is flowed out from the outlet 68 of the wind passage 60L, the travel wind carries on in a direction away from the vehicle body 3 in the vehicle width direction. Consequently, the travel wind can be prevented from heading toward the driver riding in the straddle vehicle 1, and the wind protection for this driver can be improved.

In the straddle vehicle 1 of the present embodiment, the wind passage 60L is provided with the outer wall 74L that covers the outer side of the wind passage 60L in the vehicle width direction. The outer wall 74L is disposed so as to protrude forward than at least a part of the irradiation surface 51 of the left headlight 19L.

This makes it easier to lead the travel wind which has hit on the irradiation surface 51 of the left headlight 19L in addition to the first wind-receiving surface 64L into the wind passage 60L. Generally, the headlight is formed in a relatively large area in order to easily illuminate a road surface. By collecting the travel wind received on such a relatively large area surface, the down-force caused by the travel wind passing through the wind passage 60L can be improved.

In the straddle vehicle 1 of the present embodiment, the irradiation surface 51 of the left headlight 19L is diagonally formed so that it is positioned rearward as it approaches outward in the vehicle width direction.

As a result, when the straddle vehicle 1 is running, it is easier for the travel wind that has hit on the irradiation surface 51 of the left headlight 19L to be smoothly guided to the inlet 66 of the wind passage 60L. Therefore, a decrease in the flow velocity of the travel wind that has hit on the irradiation surface 51 can be suppressed and the down-force can be obtained. In other words, the travel wind of high flow velocity is guided to the wind passage 60L. Therefore, the down-force can be improved. In addition, it is possible to suppress a decrease in the flow velocity of the travel wind that has hit on the irradiation surface 51 of the left headlight 19L and to discharge it from the outlet 68 of the wind passage 60L. Therefore, it can be suppressed that the travel wind which has hit on the irradiation surface 51 of the left headlight 19L affects the vehicle body as running resistance.

The part of the cowl 23 in which the wind passage 60L is formed is formed in a region adjacent to the left headlight 19L in the vehicle width direction. Therefore, this part also functions as a part formed to bulge out from the front end of the vehicle body 3 in order to suppress the travel wind toward the driver. Consequently, the side cowl 27 can function as a member that provides a wind protection effect by the outer wall surface and obtains down-force by the inner wall surface.

In the straddle vehicle 1 of this embodiment, the front edge of the outer wall 74L is formed so that the middle part 82 in the vertical direction of the front edge is rearward than the upper part and the lower part of the front edge.

As a result, the light irradiated by the left headlight 19L is less likely to be blocked by the outer wall 74L. Therefore, the light can be irradiated over a wide area by the left headlight 19L. In addition, it is preferable that the outer wall 74L is formed with a part covering the outer edge in the vehicle width direction of the upper edge of the first wind-receiving surface 64L from the outside in the vehicle width direction in a side view of the vehicle body 3. By this, the travel wind that is collected to the upper edge of the first wind-receiving surface 64L and then heads outward in the vehicle width direction can be guided into the wind passage 60L, and the travel wind can be prevented from deviating from the wind passage 60L.

The straddle vehicle 1 of the present embodiment includes the second wind-receiving surface 86L. The second wind-receiving surface 86L is disposed above and adjacent to the left headlight 19L and is provided so that it is positioned lower as it approaches rearward of the vehicle body.

As a result, the travel wind which has hit on the left headlight 19L when the straddle vehicle 1 is running can be prevented from riding upward against the left headlight 19L and can be led to the passage. Therefore, the down-force can be further increased. Consequently, the travel wind that has hit on the left headlight 19L can be led into the wind passage 60L, and the travel wind can be prevented from deviating from the wind passage 60L.

In the straddle vehicle 1 of the present embodiment, the irradiation surface 51 of the left headlight 19L is inclined so that it is positioned forward as it approaches upward.

As a result, the driving wind that has hit on the left headlight 19L when the straddle vehicle 1 is running can flow so as to approach the first wind-receiving surface 64L located below the left headlight 19. Accordingly, the first wind-receiving surface 64L can generate well the down-force.

In the present embodiment, a lens that is larger in the vehicle width direction relative to the vertical direction is applied to the left headlight 19L. This enables the first wind-receiving surface 64L disposed in front of the lens to be relatively large in the vehicle width direction, thereby contributing to the improvement of down-force. In addition, since the left headlight 19L is the LED type, it is easy to define the irradiation angle from the light source 55. The lens of the left headlight 19L is easy to be formed into a relatively horizontal lens shape compared to a bulb type lens. Therefore, it is easy to make the first wind-receiving surface 64L larger.

In this manner, the present embodiment can effectively collect the travel wind which has hit in front of the headlight 19L and which has hit on the headlight 19L. As a result, the down-force can be improved by preventing the first wind-receiving surfaces 64L, 64R which generate the down-force from becoming a running resistance. With such improvement of the down-force, even at a relatively low running speed, the down-force can be obtained suitably and easily.

While some preferred embodiments of the present disclosure have been described above, the foregoing configurations may be modified, for example, as follows.

For example, a plurality of airflow guiding holes 41 may be provided so that they are lined up vertically. A plurality of airflow guiding holes 41 may be provided so that they are lined up in the left-right direction. In this case, the airflow guiding holes 41 may be disposed below the left and right wind passages 60L and 60R, respectively. A case in which the airflow guiding hole 41 is not provided toward the front of the vehicle body 3 is also included in the present disclosure.

The left and right wind passages 60L, 60R may be disposed horizontally along the front-rear direction. The left and right wind passages 60L, 60R may be omitted. The second wind-receiving surfaces 86L, 86R may be omitted.

In the above embodiment, the headlights 19 are a pair of left and right headlights (a left headlight 19L and a right headlight 19R), but this is not particularly limited. For example, just one single-type headlight which is arranged at the center in the vehicle width direction of the vehicle body can be adopted. In this case, the first wind-receiving surface is disposed at the center position in the vehicle width direction.

A configuration without the first wind-receiving surface 64L, 64R, i.e., a configuration in which the travel wind has hit on the irradiation surface of the lens over a wide area is guided to the wind passages 60L, 60R to generate down-force, may be adopted for the straddle vehicle 1. In this case, when the straddle vehicle 1 is running, the down-force can be generated by guiding the travel wind is guided to the wind passages 60L and 60R and received the travel wind by the respective lower surfaces 70. As a result, the down-force can be generated.

In view of the foregoing teachings, it is apparent that the present disclosure can take many modified and variant forms. Accordingly, it is to be understood that the disclosure may be practiced in a manner other than that described herein within the scope of the appended claims.

DESCRIPTION OF THE REFERENCE NUMERALS 1 straddle vehicle
19 headlight
19L left headlight
51 irradiation surface (front surface)
60L wind passage
60R wind passage
66 inlet
68 outlet
64L first wind-receiving surface
74 outer wall
76 upper side wall
82 vertical center part of the front edge of the outer wall
86L second wind-receiving surface
103L axis line

The invention claimed is:

1. A straddle vehicle, comprising:
a headlight emitting light forward; and
a first wind-receiving surface disposed below and adjacent to the headlight and provided so that the first wind-receiving surface is positioned higher as the first wind-receiving surface approaches rearward,
wherein a wind passage having front and rear openings is formed on an outer side of the first wind-receiving surface in a vehicle width direction, wherein the front opening forms an inlet of the wind passage and the rear opening forms an outlet of the wind passage, wherein the inlet of the wind passage is open toward the first wind-receiving surface and the headlight, and wherein the wind passage is provided so that a lower surface of the wind passage is positioned higher as the lower surface approaches rearward,
wherein the wind passage is provided with an outer wall covering an outer side of the wind passage in the vehicle width direction and wherein the outer wall is disposed so as to protrude forward than at least a part of a front surface of the headlight, and
wherein a front edge of the outer wall is formed so that a center part of the front edge in a vertical direction of the front edge is rearward than an upper part and a lower part of the front edge.

2. The straddle vehicle according to claim 1, wherein the wind passage is formed diagonally so that the wind passage is positioned outward in the vehicle width direction as the wind passage approaches rearward from the inlet to the outlet of the wind passage while passing an outer side relative to the headlight in the vehicle width direction.

3. The straddle vehicle according to claim 2, wherein the wind passage is provided with an upper side wall.

4. The straddle vehicle according to claim 1, wherein the wind passage is formed so that, at the outlet of the wind passage, an axis line of the wind passage approaches outward in the vehicle width direction.

5. The straddle vehicle according to claim 1, wherein the front surface of the headlight is diagonally formed so that it is positioned rearward as it approaches outward in the vehicle width direction.

6. The straddle vehicle according to claim 1, further comprising:
a second wind-receiving surface disposed above and adjacent to the headlight and is provided so that the second wind-receiving surface is positioned lower as the second wind-receiving surface approaches rearward of a vehicle body.

7. The straddle vehicle according to claim 1, wherein the front surface of the headlight is inclined so that the front surface is positioned forward as the front surface approaches upward.

8. A straddle vehicle, comprising
a headlight emitting light forward,
wherein a wind passage having front and rear openings is formed on an outer side of the headlight in a vehicle width direction,
wherein of the front and rear openings of the wind passage, the front opening forms an inlet of the wind passage, and the rear opening forms an outlet of the wind passage,
wherein the inlet of the wind passage is open toward the headlight,
wherein the wind passage is provided so that a lower surface of the wind passage is positioned higher as the lower surface approaches rearward
wherein the wind passage is provided with an outer wall covering an outer side of the wind passage in the vehicle width direction and wherein the outer wall is disposed so as to protrude forward than at least a part of a front surface of the headlight, and
wherein a front edge of the outer wall is formed so that a center part of the front edge in a vertical direction of the front edge is rearward than an upper part and a lower part of the front edge.

* * * * *